(No Model.)
E. A. DAVIS.
COLLAPSIBLE BARREL HORSE.
No. 420,776. Patented Feb. 4, 1890.
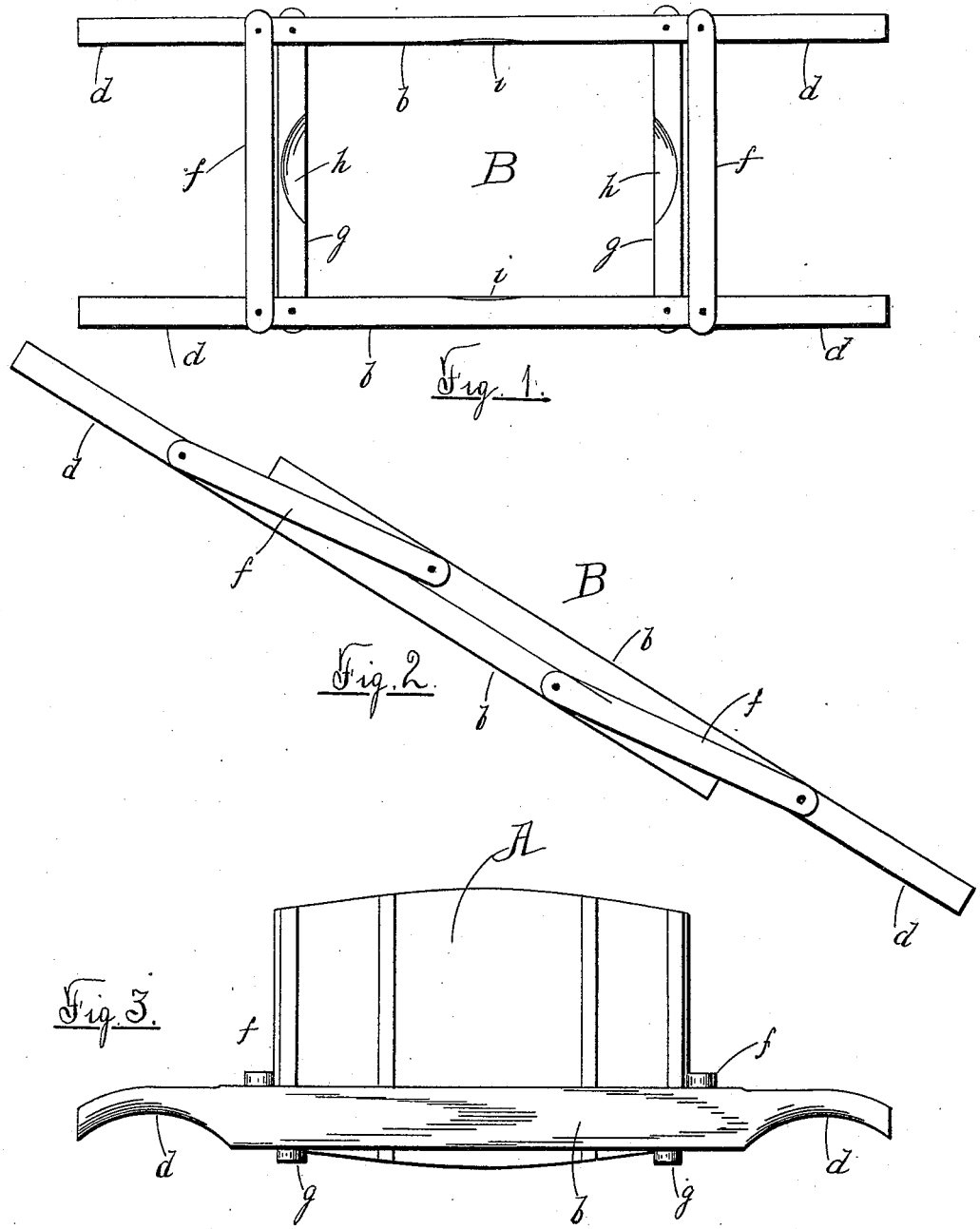
Witnesses:
M. F. Eager
R. Durfee
Inventor:
Eugene A. Davis,
By his Attorneys
C. A. Shaw & Co.

UNITED STATES PATENT OFFICE.

EUGENE A. DAVIS, OF DOVER, NEW HAMPSHIRE.

COLLAPSIBLE BARREL-HORSE.

SPECIFICATION forming part of Letters Patent No. 420,776, dated February 4, 1890.

Application filed December 2, 1889. Serial No. 332,288. (No model.)

*To all whom it may concern:*

Be it known that I, EUGENE ADELBERT DAVIS, of Dover, in the county of Strafford, State of New Hampshire, have invented certain new and useful Improvements in Collapsible Barrel-Horses, of which the following is a description sufficiently full, clear, and exact to enable any person skilled in the art or science to which said invention appertains to make and use the same, reference being had to the accompanying drawings, forming part of this specification, in which—

Figure 1 is a plan view of my improved horse open; Fig. 2, a like view of the horse folded, and Fig. 3 an elevation showing the horse in use with a barrel.

Like letters and figures of reference indicate corresponding parts in the different figures of the drawings.

My invention relates to a horse or rack for transporting barrels by hand; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the barrel, and B the horse, considered as a whole. The horse consists of two parallel side bars $b$, having their ends reduced, as shown in Fig. 3, to form handles $d$. A cross-bar $f$ connects side bars $b$ near each handle $d$, said cross-bars being pivoted at both ends to the upper edges of the side bars. Two cross-bars $g$ are pivoted to the lower edges of the side bars $b$, between the vertical planes of the cross-bars $f$. The upper faces of the cross-bars $g$ are grooved centrally at $h$ to receive the barrel. The inner edges of the side bars $b$ are also grooved centrally at $i$ on arcs of the same circle as the longitudinal curve of the barrel-staves.

In the use of my improvement, the rack being distended, as shown in Fig. 1, the barrel A may readily be disposed therein and rest on the cross-bars $g$. The cross-bars engage the ends of said barrel and prevent the horse from accidentally collapsing or the barrel from moving longitudinally thereon. When not in use, the cross-bars being pivoted to the side bars on opposite sides thereon, said side bars may be readily brought together, closing or folding the horse, as shown in Fig. 2.

It will be seen that my improvement is especially adapted for conveying barrels by hand up inclines or from one story of a building to a higher story.

Having thus explained my invention, what I claim is—

1. A collapsible barrel-horse comprising two parallel side bars connected by two pivoted cross-bars on their upper edges and by two correspondingly-pivoted cross-bars on their lower edges, said lower cross-bars being disposed between the vertical planes of the upper cross-bars, substantially as and for the purpose set forth.

2. A collapsible barrel-horse B, comprising the side bars $b$, connected by pivoted cross-bars $f$ $g$, combined and arranged to operate substantially as set forth.

3. The horse B, comprising the parallel side bars $b$, provided with handles $d$, pivoted cross-bars $f$, connecting the upper edges of said side bars, the pivoted cross-bars $g$, connecting the lower edges of said side bars and provided with the barrel-grooves $h$, substantially as described.

EUGENE A. DAVIS.

Witnesses:
ROBERT G. PIKE,
SAMUEL S. PARKER.